Dixon

[15] 3,640,336
[45] Feb. 8, 1972

[54] RECOVERY OF GEOTHERMAL ENERGY BY MEANS OF UNDERGROUND NUCLEAR DETONATIONS

[72] Inventor: Rod P. Dixon, Salt Lake City, Utah
[73] Assignee: The United States of America as represented by the United States Atomic Energy Commission
[22] Filed: June 19, 1970
[21] Appl. No.: 47,699

Related U.S. Application Data

[60] Division of Ser. No. 795,190, Jan. 30, 1969, Pat. No. 3,608,636, which is a continuation-in-part of Ser. No. 734,661, June 5, 1968, and a continuation-in-part of 541,810, Apr. 11, 1966.

[52] U.S. Cl. ...................165/1, 60/26, 165/45, 166/247
[51] Int. Cl. ...................................F28f 13/12
[58] Field of Search ..............165/45, 1; 60/26; 166/247

OTHER PUBLICATIONS

"Non-military uses of nuclear explosive" by Gerald W. Johnson and Harold Brown; Scientific American, Dec. 1918 Vol. 199 No. 6—pp. 29–35

Primary Examiner—Charles Sukalo
Attorney—Roland A. Anderson

[57] ABSTRACT

Geothermal steam is generated by setting off an underground nuclear detonation above a naturally hot stratum of igneous rock and thereafter introducing water into the formation above the hot stratum which has been made permeable by the nuclear detonation.

1 Claims, 2 Drawing Figures

PATENTED FEB 8 1972

3,640,336

INVENTOR.
ROD P. DIXON

BY

3,640,336

RECOVERY OF GEOTHERMAL ENERGY BY MEANS OF UNDERGROUND NUCLEAR DETONATIONS

CROSS-REFERENCE TO RELATED APPLICATIONS

This is a divisional application of application Ser. No. 795,190 filed Jan. 30, 1969, now U.S. Pat. No. 3,608,636 issued Sept. 28, 1971, which is a continuation-in-part of copending applications Ser. No. 541,810, filed Apr. 11, 1966, now abandoned, and Ser. No. 734,661, filed June 5, 1968.

BACKGROUND OF THE INVENTION

It is well known that a nuclear detonation underground will create a cylinder or roofed-over chimney filled with broken rock, normally with a void space at the top. This is brought about by a large, hot cavity filled with vaporized rock being created about the detonation point. The formation of the initial hot cavity as the vaporized mass expands following the shock wave and the subsequent and progressive caving of the cavity roof and the formation of the cylinder of fragmented rock are very well known and do not require further description. Such a cylinder of broken material contains chunks of fractured rock, which range randomly in size from sand grains to huge boulders. Normally, there is a permeability between 25 percent and 40 percent.

In such detonations radioactive elements are released in or as a result of the detonation and thereafter may impart excessive radioactivity to products which are to be removed from the formation. If water is present or subsequently enters a nuclearly detonated formation containing tritiated water or other water-soluble radioactive detonations products, the water itself then becomes excessively radioactive and unfit for inclusion in municipal water supplies or for other purposes where its radiation may constitute an impermissible health hazard.

OBJECTS OF THE INVENTION

It is accordingly one object of this invention to provide a method for minimizing the hazards of radioactive contamination which attend the fragmentation of geological formations by underground nuclear detonations.

Another object of this invention is to use underground nuclear detonation in combination with strata of igneous rock naturally heated in the formation to a temperature substantially above the boiling point of water to recover geothermal energy.

Other objects will become obvious from the following description and claims.

GENERAL DESCRIPTION OF THE INVENTION

In carrying out this invention, a nuclear explosive is detonated underground within a zone above hot igneous rock. The zone for the explosive is selected far enough below ground to be nonventing and far enough above the igneous rock so that the ambient temperature is too low to interfere with the functioning of the nuclear explosive. The nuclear explosive must form a chimney which extends into a zone of rock having a temperature greater than 200° C.

Water is then introduced into the chimney, producing steam when it comes into contact with the stratum of igneous rock. The steam produced is withdrawn and is used as a source of energy.

If the steam generated in the first stage after the nuclear detonation contains an excessive amount of radioactivity, it may be collected at the surface and segregated for safe disposal until a subsequent portion of the steam has a radioactivity level which is acceptable for the intended use.

The invention will be further described in the following example.

EXAMPLE

Figure 1:
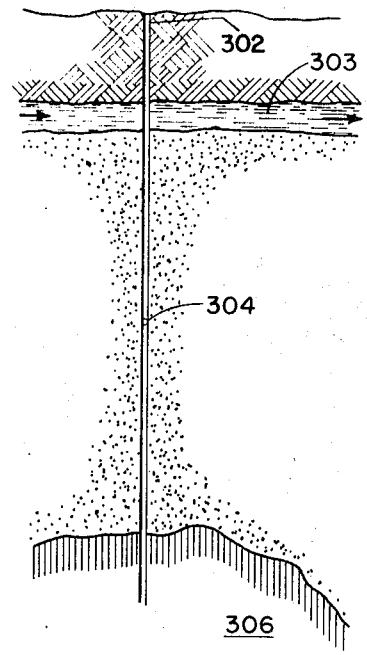
FIG. 1 is a vertical section through a mineral formation in which an entry hole for a nuclear explosive has been placed.
Figure 2:
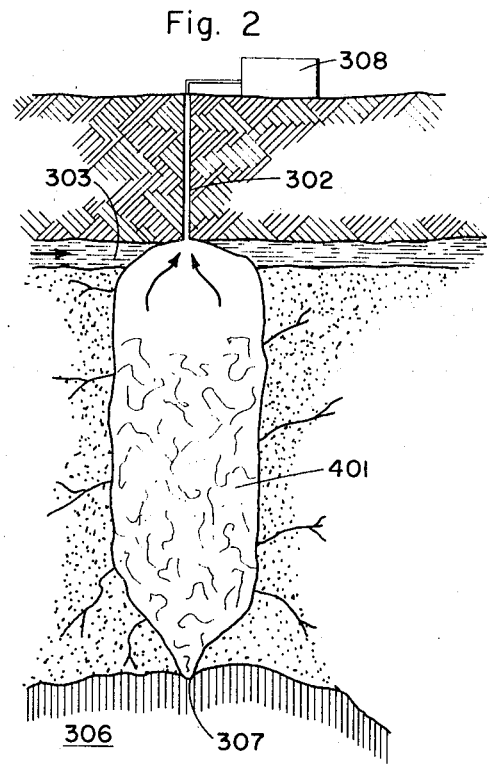
FIG. 2 is a vertical section through the formation shown in FIG. 1 after the nuclear explosive has been detonated showing the chimney formed from the detonation.

As illustrated in FIGS. 1 and 2, a thermonuclear device 304 is detonated under nonventing conditions beneath an aquifer 303 which traverses a geological formation above a stratum of igneous rock 306 which is naturally heated to a temperature which is sufficient to vaporize water. If the temperature of the hot igneous stratum is such that a nuclear explosive device may properly function therein the device may be placed within or in the immediate vicinity of such a stratum and there detonated, creating a chimney or cylinder of fragmented formation extending from said hot stratum upward. If the fragmented formation is traversed by an aquifer or underground stream 303, the water therefrom descends through the chimney 401 down to the hot stratum and is vaporized whereupon the steam may be withdrawn from an upper portion of the chimney through well 302 to be used at the surface for generation of electricity in a power plant 308 or for other useful work. If the aquifer bed downstream from the chimney permits excessive leakage of steam into the formation it may be sealed in a conventional manner, for instance, by drilling a separate well at an appropriate downstream location an injecting a cementitious or other sealing composition which reduces any excessive porosity to an acceptable level so that the steam can properly be recovered through well 302. If there is no subterranean water available in the formation, a surface stream may be diverted into the chimney for evaporation.

If the temperature of the heated igneous rock is too high to permit proper functioning of the nuclear device in the immediate vicinity thereof, the desired result may be achieved by drilling a well 302 from the surface down to the hot stratum and thereafter placing and detonating the device 304 in the well or entry means at a distance above the hot igneous stratum where the temperature of the surrounding formation is suitable, e.g., 200° C. or less. In this case, which is the case specifically illustrated in FIGS. 1 and 2, the usual cylindrical chimney 401 is formed from the point of detonation upward but at the same time the formation is also fragmented in a downward direction along the well 304 into the hot igneous rock 306 so that permeable communication is established therewith, as shown at 307. Thereafter when water is introduced into the fragmented chimney from the aquifer 303 or from an available surface source, steam is formed and recovered therefrom in the same manner as described earlier herein.

The scope of the invention is more particularly pointed out in the appended claims.

What is claimed is:

1. A process for producing steam in a formation which contains deep below the earth surface a stratum of igneous rock naturally heated to a temperature above 200° C. with rock at progressively lower temperatures thereabove, which process comprises:

drilling a hole down to said heated stratum, placing a nuclear explosive in an intermediate portion of said hole between said heated stratum and the earth's surface at a depth sufficient to avoid venting of detonation products into the atmosphere and at a location where the temperature is less than 200° C., detonating said explosive and thereby creating a nuclearly detonated chimney of fragmented rock reaching down to said heated stratum, introducing water into one portion of said fragmented chimney where it runs down and becomes vaporized, and withdrawing steam from another portion of said chimney.

* * * * *